Oct. 13, 1964 N. J. IVINS 3,152,818
BRACKET HOLD-DOWN DEVICE
Filed May 8, 1961 2 Sheets-Sheet 1
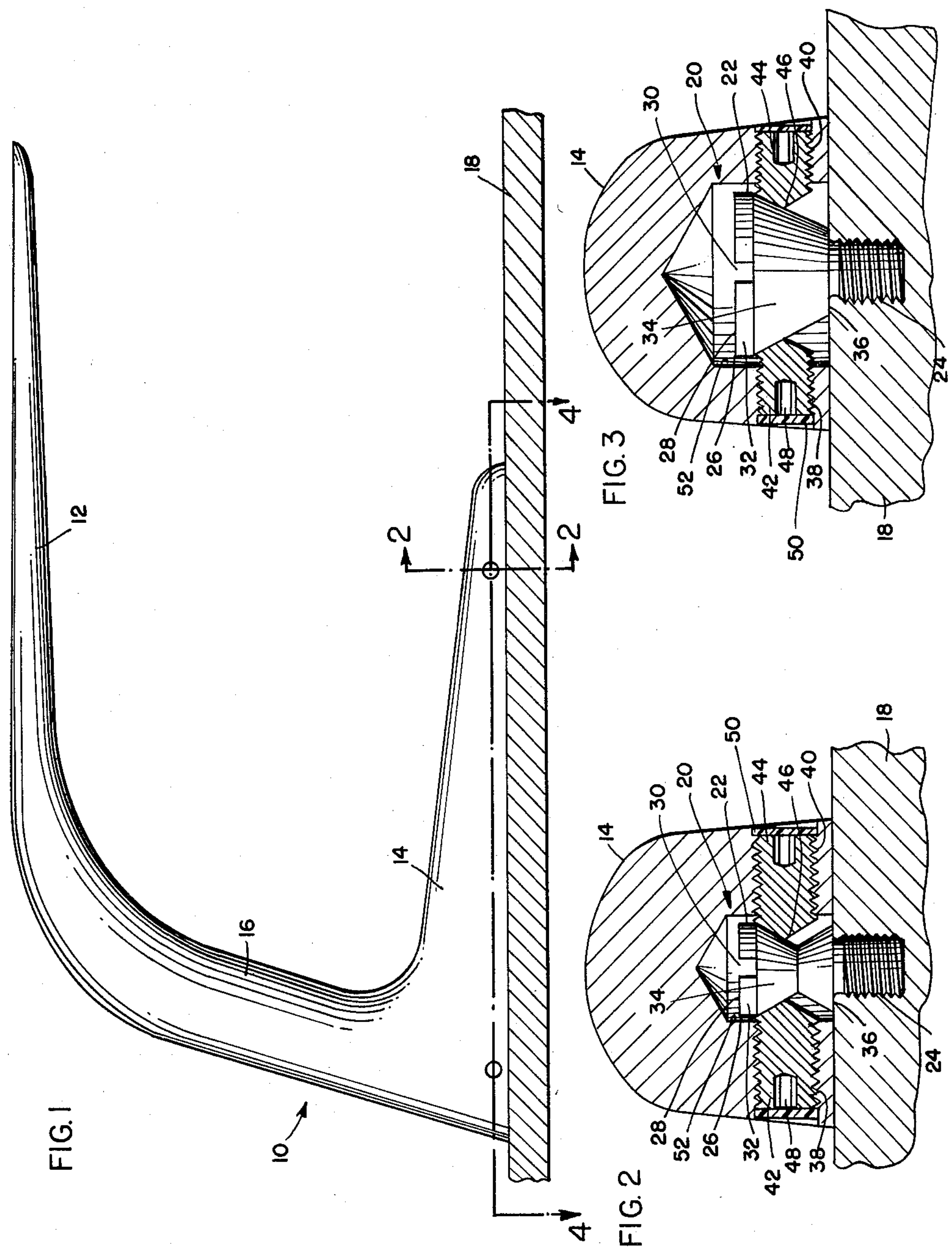
INVENTOR:
NELSON J. IVINS
BY Watson D. Harbaugh
ATT'Y BRACKET HOLD-DOWN DEVICE
Filed May 8, 1961 2 Sheets-Sheet 2
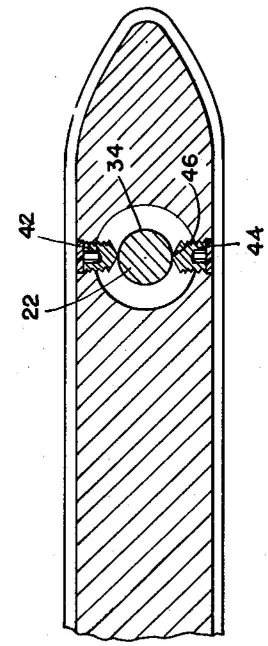
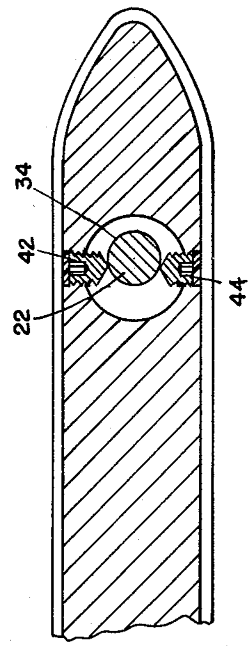
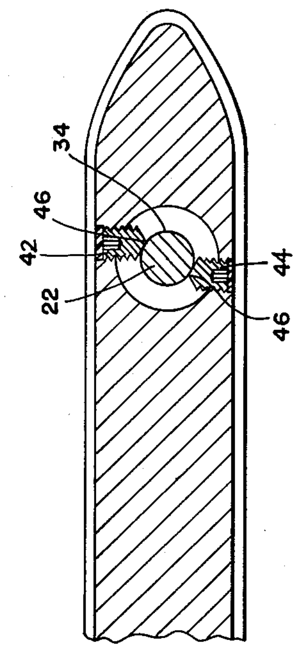
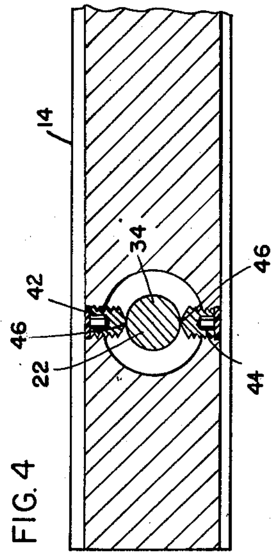
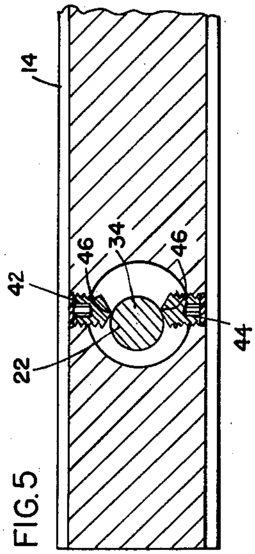
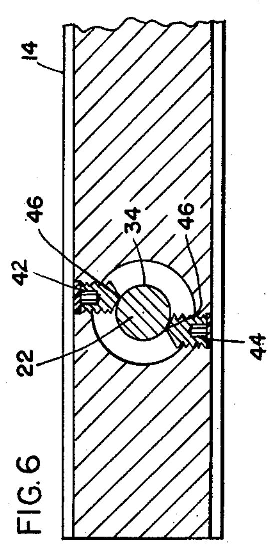
*INVENTOR:*
NELSON J. IVINS
*BY* Watson D. Harbaugh
ATT'Y United States Patent Office 3,152,818

Patented Oct. 13, 1964

3,152,818

BRACKET HOLD-DOWN DEVICE

Nelson J. Ivins, Spring Lake, Mich., assignor to The Bastian-Blessing Company, Chicago, Ill., a corporation of Illinois Filed May 8, 1961, Ser. No. 108,351

2 Claims. (Cl. 287—20)

This invention relates in general to a hold-down device and in particular to a concealed, internal hold-down device for securing a bracket to a flat surface.

Heretofore, brackets have generally been secured to a base surface by use of a screw or a bolt member passing through the bracket and into the base surface. These screw and bolt members necessitate leaving the head portions thereof directly exposed on the bracket surface or, if recessed in the bracket, there still remains the recessed opening on the bracket surface. Considerable dimensional control in the formation of the bracket has been required to insure proper alignment of the bracket when installed since it is often necessary to form openings in both the bracket and the surface to which it is to be secured for receipt of the screw or bolt members. Further, lack of adjustability, ease of removal and replacement of the bracket, wear and failure of the preformed threaded holes in the base surface with frequent removal and replacement, and lack of desired strength and positive securement are but a few of the shortcomings of prior hold-down devices of this character.

Accordingly, it is the primary obejct of this invention to provide an improved hold-down device for securing a bracket to a surface which eliminates the shortcomings and disadvantages of prior devices of this character.

It is a specific object of this invention to provide an improved hold-down device for securing a bracket to a base surface which is entirely disposed within the bracket to eliminate exposure of the hold-down members and permits a greater latitude in design of the bracket.

Another object of this invention is to provide an improved hold-down device that eliminates the necessity of requiring dimensional control of tolerances of the bracket to permit proper alignment of the bracket when securing it to a base surface.

A further object of this invention it to provide an improved hold-down device for securing a bracket to a base surface which readily permits lateral adjustment of the bracket in any direction yet rigidly secures the bracket to the surface.

A still further object of this invention is to provide an improved hold-down device which is completely hidden from view yet provides a greater surface area of contact for securement of the bracket to a surface.

Another object of this invention is to provide an improved hold-down device for securing a bracket to a base surface which readily permits removal and replacement of the bracket with a minimum of effort, eliminates the possibility of marring a finished outer surface during installation and removal, yet affords maximum positive securement at all times, when in the hold-down position, regardless of the number of times of removal and replacement.

Another object of this invention is to provide an improved hold-down device for securing a bracket to a flat surface which is simple in design, economical to manufacture, rugged in construction, yet provides positive securement of the bracket to a surface.

With these and other objects in mind, the invention resides in the combination of parts and in the details of construction and operation hereinafter set forth in the following specification and appended claims, certain embodiments thereof being illustrated in the accompanying drawings in which:

FIG. 1 is a partially sectioned view in side elevation illustrating a bracket secured to a flat surface;

FIG. 2 is a fragmentary, enlarged, partially sectioned view taken along the line 2—2 of FIG. 1 illustrating the relationship of the preferred embodiment of the hold-down device of this invention with a bracket secured to a flat surface;

FIG. 3 is a fragmentary, enlarged, partially sectioned view taken along the line 2—2 of FIG. 1 illustrating an alternate embodiment of the hold-down device of this invention in relationship with a bracket secured to a flat surface;

FIG. 4 is a fragmentary sectional view of the bracket taken along the line 4—4 of FIG. 1 illustrating the position of the hold-down members of this device when all of the component parts are in perfect alignment;

FIG. 5 is a fragmentary sectional view of the bracket taken along the line 4—4 of FIG. 1 illustrating a position of the hold-down members of this device to provide lateral and longitudinal adjustment; and FIG. 6 is a fragmentary sectional view of the bracket taken along the line 4—4 of FIG. 1 illustrating an alternate position of the set screws of this device to provide lateral and longitudinal adjustment.

Referring now to FIG. 2, the preferred embodiment of the hold-down device of this invention, indicated generally by the numeral 20, is illustrated in the hold-down position securing a bracket 10 having an upper arm 12, a lower leg 14, and support member 16 to a base surface 18. The hold-down device 20 includes a stud member 22 which provides a lower threaded shank portion 24 and an upper head portion 26. Head portion 26, having a circular contour, provides an upper surface 28 in which a slot 30 is formed for receipt of a driving instrument to aid in threadably engaging the shank portion 24 into the base surface 18. An outer surface 32, about the periphery of the head portion 26, extends downwardly at right angles a short distance from the upper surface 28. Extending downwardly and inwardly in tapered fashion from the lower edge of the outer surface 32 is a holding surface 34 which then extends outwardly again, forming inverted conical frustrous, to a diameter equal to the diameter of outer surface 32 to form a flat bearing surface 36. Centrally formed and depending from the bearing surface 36 of the holding surface 34 is the threaded shank portion 24.

A cylindrical aperture 52 is formed in the under surface of leg 14 of the bracket to receive the head portion 26 of the stud member 22. The internal diameter of the aperture 52 is substantially greater than the external diameter of head 26 to permit ease of installation and to provide for lateral adjustment of the bracket as will be readily understood from the description to follow.

Still referring primarily to FIG. 2, threaded apertures 38 and 40 are formed on opposite sides of the bottom leg 14 of the bracket. Hold-down set screws 42 and 44 are threadably engaged in the apertures 38 and 40 respectively, and each provide a cone or tip 46 which is angularly contoured to correspond to the angle of taper of the holding surface 34. Each of the set screws 42 and 44 are preferably provided at their other end with an internal hexagonal central recess 48 to receive a tool to aid in turning the set screws into the hold-down position. To aid in the overall design and to enhance the outer surface of the bracket, a plug 50, preferably of plastic, is disposed within the apertures 38 and 40 with the outer surface thereof flush with the outer surface of leg 14. Plug 50 if often required and highly desirable to seal off the pockets formed by the threaded apertures 38 and 40 to eliminate the collection of dirt particles therein.

Referring now more particularly to FIG. 3, an alternate embodiment of the hold-down device of this invention is illustrated. In view of the similarity of corresponding parts of this embodiment with that of the preferred embodiment like numerals have been used to indicate like parts. The variation of this embodiment from that of the preferred embodiment is principally found in the holding surface 34 which provides a continually inwardly tapered surface extending from the outer surface 32 to the bearing surface 36, rather than forming a double-cone shaped contour as in the preferred embodiment. As readily seen by a comparison of FIGS. 2 and 3, the bearing surface 36 of the embodiment in FIG. 3 is of the same diameter, providing equal surface area in contact with the base surface 18, as the preferred embodiment in FIG. 2 when the stud is fully threaded into the surface 18 but the alternate embodiment of FIG. 3 requires a greater outside diameter of the head portion 26 to provide this equal surface area and still retain the same angle of taper for holding surface 34. The relationship of screw members 42 and 44 with the tapered holding surface 34 is identical to that as described for the preferred embodiment.

Referring now primarily to FIGS. 4, 5 and 6, various alternate positioning of the screw members 42 and 44 relative to the stud member 22 are illustrated to provide lateral displacement of the bracket to procure proper alignment if necessary.

As the angular tips 46 of set screws 42 and 44 engage the inwardly tapered holding surface 34, the axial force created by turning the screw members inwardly will tend to force the tips 46 downwardly along the surface 34 which in turn will draw the bracket downwardly against the base surface as best seen in FIGS. 2 and 3.

When the screw members are disposed diametrically opposite each other to contact the stud at its centermost point as seen in FIG. 4, the total force will be directed in a downwardly direction. As seen in FIG. 5, if the screw members are disposed diametrically opposite each other but offset to contact the stud eccentrically of its centermost point, the force will not only be directed downwardly to draw the bracket into contact with the base surface but creates a wedging force to eliminate any possible longitudinal movement of the bracket. As readily seen in FIG. 5, the desired wedging force and hold-down forces are attained even if the recess 52 or stud member 22 are inadvertently offset for perfect alignment therebetween. In similar manner, as seen in FIG. 6, the set screws may be offset from one another to engage the stud member on both sides of the center point thereof to create both the downward holding force and a wedging force to align the bracket laterally and longitudinally.

With the internal diameter of the recess 52 being substantially greater than the longest diameter of head portion 26 of stud 22, it is now apparent that the bracket may be readily adjusted in the horizontal plane for proper alignment by varying the amount of penetration of the screws 42 and 44 into the recess 52 for contact with the holding surface 34.

Thus it is seen that the construction of the hold-down device of this invention not only simplifies the manufacture of the bracket and lowers the cost for the positive securement of a bracket to a base surface, but also provides maximum strength and rigidity of securement, permits lateral and longitudinal adjustment of the bracket, permits ready removal and replacement of the bracket, yet is entirely disposed within the bracket, completely hidden from view, permitting greater latitude in design.

By the utilization of the stud member as described, assembly time is greatly reduced since all connections and attachment of the bracket is readily accomplished. In many instances it is either physically impossible or else the work space beneath the base surface is so inaccessible that it is impossible to secure the bracket by previous conventional hold-down devices. The construction of the hold-down device of this invention permits complete installation of the bracket on the upper or exposed surface of the base surface in all instances, yet is completely concealed within the bracket.

While the foregoing specification sets forth the invention in specific terms, it is to be understood that numerous changes in the shape, size and configuration of the component parts may be resorted to without departing from the spirit and scope of the invention as claimed hereinafter.

What is claimed:

1. A hold-down device for releasably securing a bracket to a base surface comprising a stud member threadably secured to the base surface, the head portion of said stud providing an upper surface and a lower bearing surface, an angularly contoured surface including an inwardly tapered holding surface and an outwardly tapered surface extending therefrom between said upper surface and said bearing surface, a circular recess formed in the under surface of the bracket to receive the head portion of the stud member, said circular recess having an inside diameter greater than the outside diameter of said head portion of the stud and a pair of locking screw members threadably mounted in the side walls of the bracket, said screw members providing tapered ends for mating engagement with the tapered holding surface of said stud member for securing the bracket to said base surface, said pair of locking screw members threadably mounted in the side walls of the bracket being disposed diametrically opposite one another but offset to engage the stud member eccentrically of the centermost point thereof.

2. A hold-down device for releasably securing a bracket to a base surface comprising a stud member threadably secured to the base surface, the head portion of said stud providing an upper surface and a lower bearing surface, an angularly contoured surface including an inwardly tapered holding surface and an outwardly tapered surface extending therefrom between said upper surface and said bearing surface, a circular recess formed in the under surface of the bracket to receive the head portion of the stud member, said circular recess having an inside diameter greater than the outside diameter of said head portion of the stud and a pair of locking screw members threadably mounted in the side walls of the bracket, said screw members providing tapered ends for mating engagement with the tapered holding surface of said stud member for securing the bracket to said base surface, said pair of locking screw members threadably mounted in the side walls of the bracket being offset relative to one another to engage the stud member on both sides of the centermost point of the stud.

References Cited in the file of this patent

UNITED STATES PATENTS

| | | |
|---|---|---|
| 661,913 | Hayes | Nov. 13, 1900 |
| 675,765 | Barry | June 4, 1901 |
| 1,958,817 | Gase | May 15, 1934 |
| 2,146,100 | Walch | Feb. 7, 1939 |
| 2,613,961 | Westcott | Oct. 14, 1952 |
| 2,619,368 | Anderson | Nov. 25, 1952 |
| 2,808,278 | Snyder | Oct. 1, 1957 |
| 3,017,657 | Mills | Jan. 23, 1962 |

FOREIGN PATENTS

| | | |
|---|---|---|
| 25,001 | Great Britain | 1910 |